Jan. 11, 1949. H. G. BLUMBERG ET AL 2,458,826
WATER HEATING TYPE FUEL CONDITIONER
Filed July 21, 1947 2 Sheets-Sheet 2

INVENTORS.
Hamilton G. Blumberg
Elbert M. Stevens
BY Victor J. Evans & Co.
ATTORNEYS Patented Jan. 11, 1949

2,458,826

UNITED STATES PATENT OFFICE 2,458,826

WATER HEATING TYPE FUEL CONDITIONER

Hamilton G. Blumberg and Elbert M. Stevens, San Antonio, Tex.

Application July 21, 1947, Serial No. 762,308

1 Claim. (Cl. 123—122)

This invention relates to a water heating type fuel conditioner.

It is an object of the present invention to provide a fuel conditioner which can be used to treat low grade fuel for use in tractors and industrial units, that utilizes the heated cooling water of the engine for supplying the heat necessary for conditioning the fuel that may be easily mounted as a unit on the cylinder head of the engine.

Other objects of the present invention are to provide a water type fuel conditioner for internal combustion engines which is of simple construction, easy to install, inexpensive to manufacture and efficient in operation.

Figure 1:
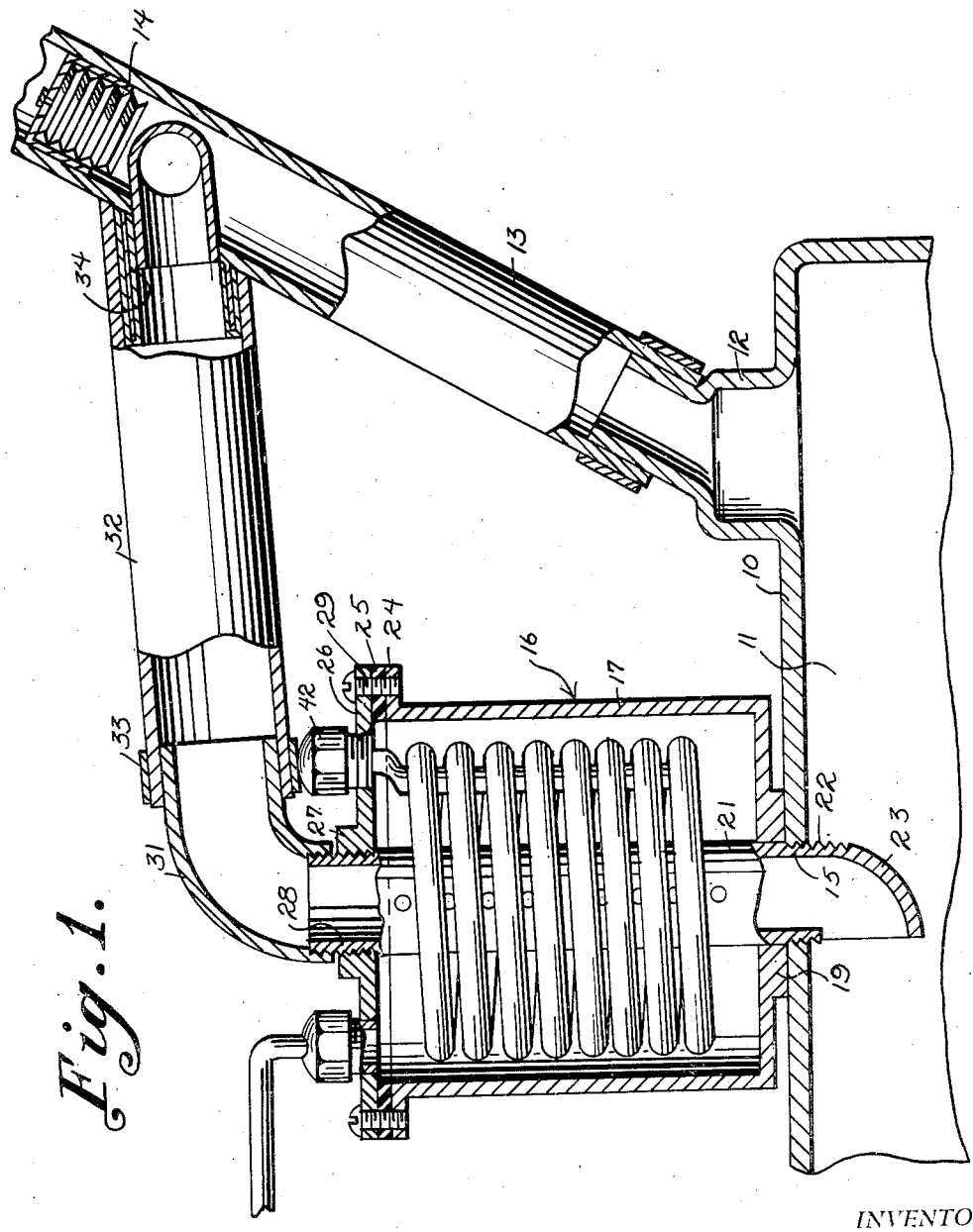
Figure 2:
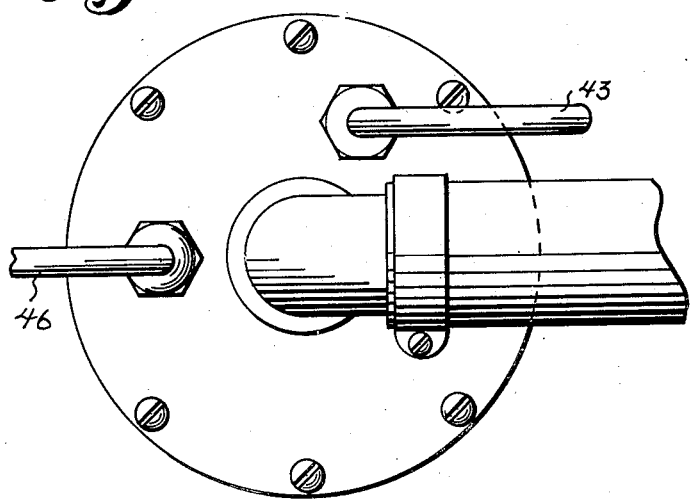
Figure 3:
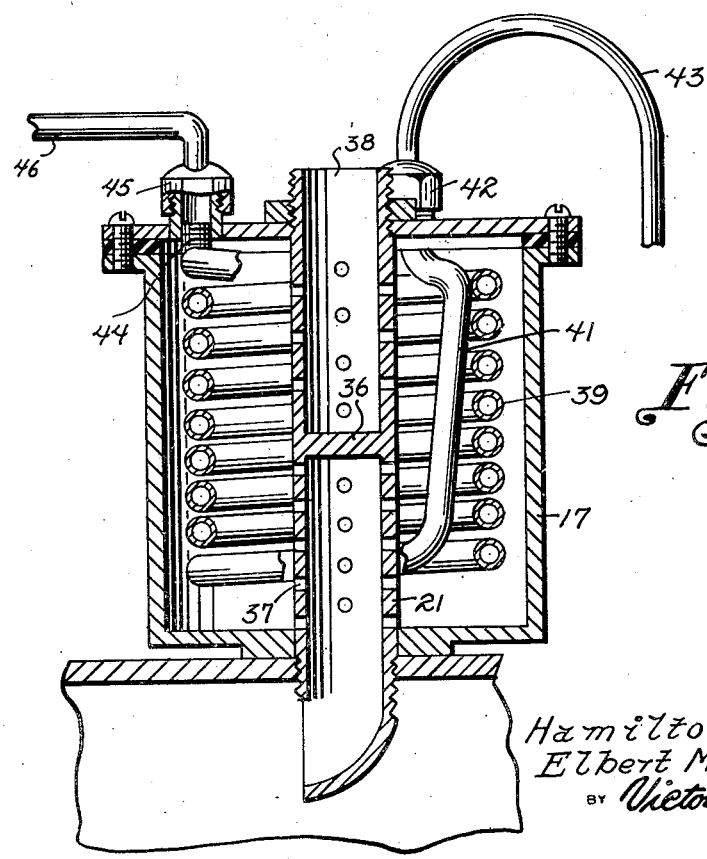

For a better understanding of the invention, reference may be had to the following detailed description taken in connection with the accompanying drawing, in which Fig. 1 is a fragmentary and cross-sectional view of an engine with my fuel conditioner installed upon it, Fig. 2 is a top plan view of my fuel conditioner, Fig. 3 is a cross-sectional view taken through the center thereof and in elevation.

Referring now to the figures, 10 represents a cylinder head of an internal combustion engine having a water chamber 11 with an outlet formation 12 for the connection thereto of a hose 13 extending to and in the direction of the top of a radiator and which has therein a thermostat 14 for controlling the water flow through the engine.

In this cylinder head is a threaded opening 15 into which my unit or conditioner 16 may be extended and retained to extend upwardly from the top thereof. My conditioner comprises a casing 17 having a bottom 18 therein with a thickened portion 19 downwardly through which extends a central pipe 21 with threads thereon as indicated at 22 engaging with the opening 15 of the cylinder head. This pipe 21 has an elbow turn 23 on its lower end so that its inlet will be extended toward the direction of flow of the water through the cylinder head so that such water will be scooped up for delivery upwardly through the pipe 21 and into the casing 17.

The top of the casing 17 has a flange 24 on which is disposed a gasket 25 and a cover plate 26 bossed at 27 to receive threaded end 28 of pipe 21 for the communication of water out of the unit. The gasket and plate 26 are retained on the flange 24 by fastening screws 29. The upper end of the pipe as indicated at 28 extends above the boss 27 and has an elbow 31 fitted to the same. A hose 32 is coupled to the elbow 31 by a clamp ring 33 and leads to hose 13 extending from the outlet of the cylinder head. The hose 13 has a sleeve projection 34 extending outwardly therefrom to which the hose 33 is connected. Water having passed through the conditioner 16 is directed to the hose 13 from which it is returned to the engine by way of the radiator.

As viewed more clearly in Fig. 3, it will be seen that pipe 21 has a partition 36 therein and perforations 37 and 38 located respectively below and above the partition 36. Water will accordingly leave the lower part of the pipe 21 through the perforations 37 and will then be returned to the upper portion of the pipe through the perforations 38. This water when in the casing 17 will heat pipe coils 39 through which fuel may be extended. An inlet portion 41 extends upwardly from a bottom coil and is connected with a fitting 42 to which leads a fuel supply pipe 43 from a fuel pump, not shown. An upper coil is connected by a pipe portion 44 with an outlet fitting 45 from which extends a pipe 46 for delivering the heated fuel to a carburetor.

While various changes may be made in the detail construction it shall be understood that such changes shall be within the spirit and scope of the present invention as defined by the appended claim.

We claim:

A fuel conditioner comprising a casing having a bottom, a central pipe extending through the bottom and having a thread portion adapted to be extended through and connected to a cylinder head of an internal combustion engine, means for closing the top of the casing, said pipe extending upwardly through the top closing means and adapted to have outlet pipe means connected thereto, said central pipe having a partition to divide the top and bottom portions, each of said portions having perforations whereby water entering the pipe will leave the perforations of the bottom portion to fill the casing and will enter the perforations of the top portion to leave the pipe, and pipe coils within the casing about the pipe and connected with fittings in the top closing means, inlet and outlet pipes connected with the fittings.

HAMILTON G. BLUMBERG.
ELBERT M. STEVENS.

REFERENCES CITED

The following references are of record in the file of this patent:

UNITED STATES PATENTS

| Number | Name | Date |
|---|---|---|
| 1,109,025 | Taylor | Sept. 1, 1914 |
| 1,318,265 | Clemmensen | Oct. 7, 1919 |
| 2,408,605 | Brookes | Oct. 1, 1946 |